Nov. 1, 1966  H. G. DAVIS ET AL  3,281,901

MODEL FORMER FOR DENTAL ARCHES

Filed Jan. 9, 1964  2 Sheets-Sheet 1

INVENTORS
THAYER R. BRUNSON
HAROLD G. DAVIS
BY *Sheridan and Ross*

ATTORNEYS

Nov. 1, 1966  H. G. DAVIS ET AL  3,281,901
MODEL FORMER FOR DENTAL ARCHES
Filed Jan. 9, 1964  2 Sheets-Sheet 2
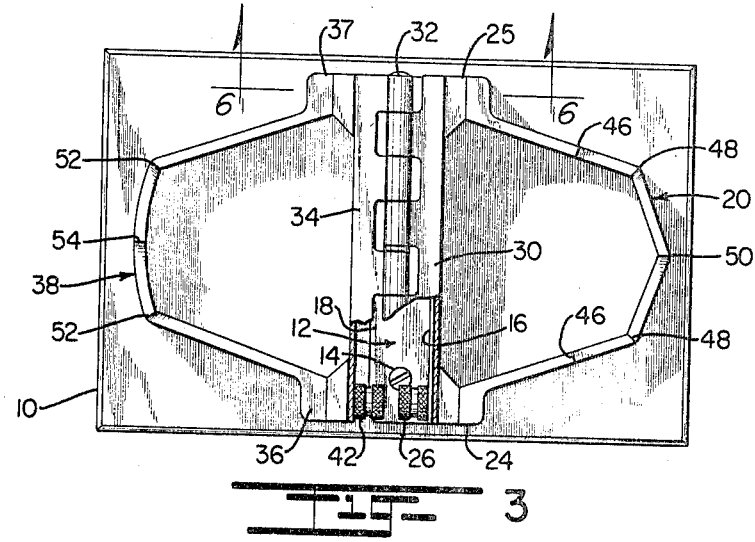
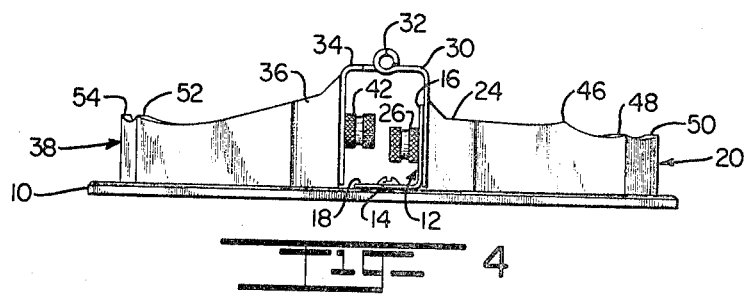
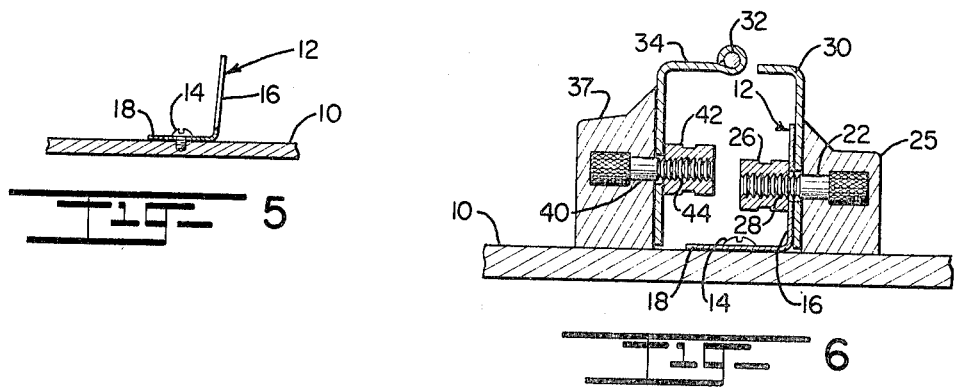
INVENTORS
THAYER R. BRUNSON
HAROLD G. DAVIS
BY Sheridan and Ross
ATTORNEYS

United States Patent Office 3,281,901
Patented Nov. 1, 1966

3,281,901
MODEL FORMER FOR DENTAL ARCHES
Harold G. Davis, Denver, and Thayer R. Brunson, Wheat Ridge, Colo., assignors to Rocky Mountain Dental Products Co., Denver, Colo., a corporation of Colorado
Filed Jan. 9, 1964, Ser. No. 336,807
6 Claims. (Cl. 18—34.1)

This invention relates to a device for molding models of mating upper and lower dental arches.

When a dentist or orthodonist is working on a patient's teeth with various objectives, such as altering the alignment of the teeth, it is highly desirable to have available for study models of the dental arches mounted in proper occlusal alignment. Models can be made periodically during the treatment to observe the alignment progress or other results which are being achieved.

In making the models, the dentist first makes an impression in wax, rubber, or other suitable material of the patient's upper and lower dental arches. From these impressions, models of the arches are made of plaster of Paris or other suitable material, these models being referred to as "rough models." Models made this way accurately reproduce the dental arches but since the models of the two arches have no bases and since the arches are separate they are not aligned occlusally and hence are not entirely reliable for study. Quite often, it was necessary to resort to grinding to bring the models of upper and lower arches into the proper occlusal alignment.

Model forming devices comprising a stationary mold and a hinged mold which folds over the stationary mold have been used to make dental arch models. The devices have not included a base, a flat surface such as a table top being used as the base on which to pour the plaster of Paris. These and other prior art devices have been subject to a number of disadvantages. It was necessary to use as a base on which to mold the models a flat surface or table top of required material and quite often it was difficult to remove the models from the surface after the models were formed. The former or mold device was unstable in that it had a tendency to fold if lifted off of the surface. It was necessary to leave the former on the base surface until the plaster of Paris was set, so that it could not be lifted from the table for inspection, or for "fingering" to contour the models. Further, it was difficult to secure proper occlusal alignment of the models of the upper and lower arches using these devices, and grinding was frequently necessary to secure the desired occlusal alignment.

Accordingly, it is an object of this invention to provide a forming device for forming models of upper and lower dental arches so mounted that when the models are removed from the former they are ready to be used for study without any grinding or further finishing.

It is another object of this invention to provide a device for forming models of upper and lower dental arches having proper occlusal alignment which device permits inspection of the models from all sides while they are being formed.

It is still another object of this invention to provide a forming mold for models of upper and lower dental arches which is stable, can be handled without folding, and which can be moved to permit inspection from various angles while the mold material is hardening.

It is a further object of this invention to provide a device for making models of dental arches which does not permit leaking of the wet mold material beneath the mold members.

The above and other objects are provided by a model former or mold device comprising a flat base having attached thereto an L-shaped mounting bracket to which is mounted a stationary mold form by means of a hinge bracket which is, in turn, connected by a hinge to a mating hinge bracket to which is mounted a movable mold form, the forms in their normal position resting flat on the top of the base. This arrangement provides for the movable form being hinged to swing from a position flat on the base to a position immediately over the stationary mold. The sides of the mounting bracket are at an obtuse angle to each other so that a torque is placed on the stationary form to hold it flat on the base.

The invention will now be described in conjunction with the accompanying drawings in which:

FIG. 3 is a top plan view of the model former partially cut away at one end to show internal structure;

FIG. 4 is an end view of the model former;

FIG. 5 is a fragmentary central section of the base in the area of the mounting bracket showing the obtuse angle of the mounting bracket, and FIG. 6 is a partial sectional view taken on the lines 6—6 of FIG. 3 looking in the direction of the arrows.

Figure 1:
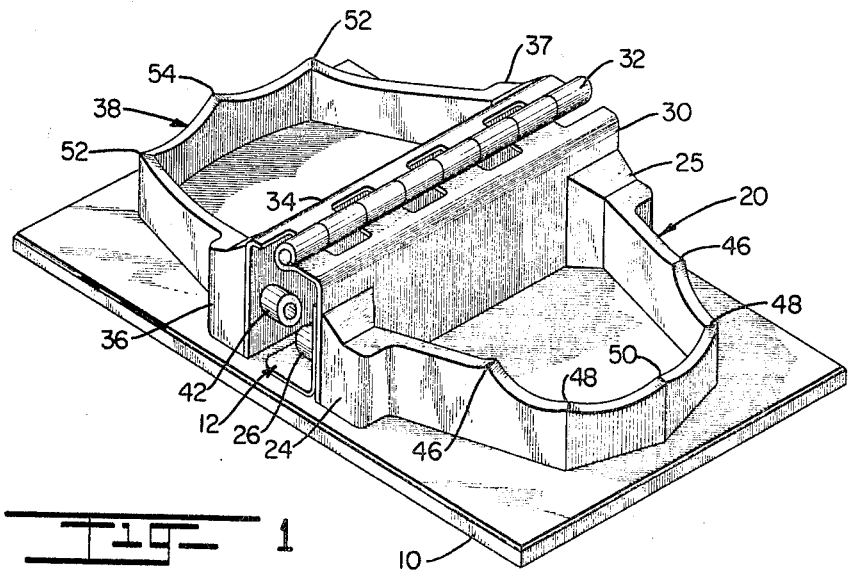
FIG. 1 is a perspective view of the model former of the invention with the movable form in the open position or flat on the base.

Referring to the drawings, there is shown in FIG. 1 the base 10 of metal, plastic, or other suitable material and having flat upper and lower faces. The lower face must fit on a flat surface and, as the upper face serves as a base of the form for forming the surface of the base of the model, it must be flat.

An L-shaped mounting bracket 12 is secured to the top surface of the base transversely thereof at a point near its center by means of screws 14 or other suitable means. This bracket is preferably made of metal having the required resiliency, although it may be made of plastic or other suitable material. As seen in FIG. 5, the L-shaped bracket 12 is constructed so that its legs or members 16 and 18 are normally at an obtuse angle with respect to each other. The purpose of this angle will be explained later; however, it has been found that an angle of about 1 to 30 degrees is adequate for obtaining the required objectives. The bracket 12 is attached to the base 10 by its member 18 with screws as previously described.

Stationary form 20 is mounted to element 16 of mounting bracket 12 by means of mounting studs 22 internally fixed within the bosses 24 and 25 of the form 20, and internally threaded mounting thumb nuts 26 threaded onto the threaded ends 28 of studs 22 which extend through the leg 16 of the mounting bracket 12.

It will be seen that when thumb nuts 26 are tightened against leg 16 of the mounting bracket 12, leg 16 is forced into an upright position substantially perpendicular with element 18 so that a torque is imposed through attachment lugs 22 exerting a downward force on form 20 forcing it against the upper surface of the base 10. The objectives of this construction are to form a seal between the form 20 and the base to prevent leakage of mold material in wet form between the bottom of the form and the top of the base and hold form 20 perfectly parallel with the surface of base 10, and to provide stability for the former.

Figure 2:
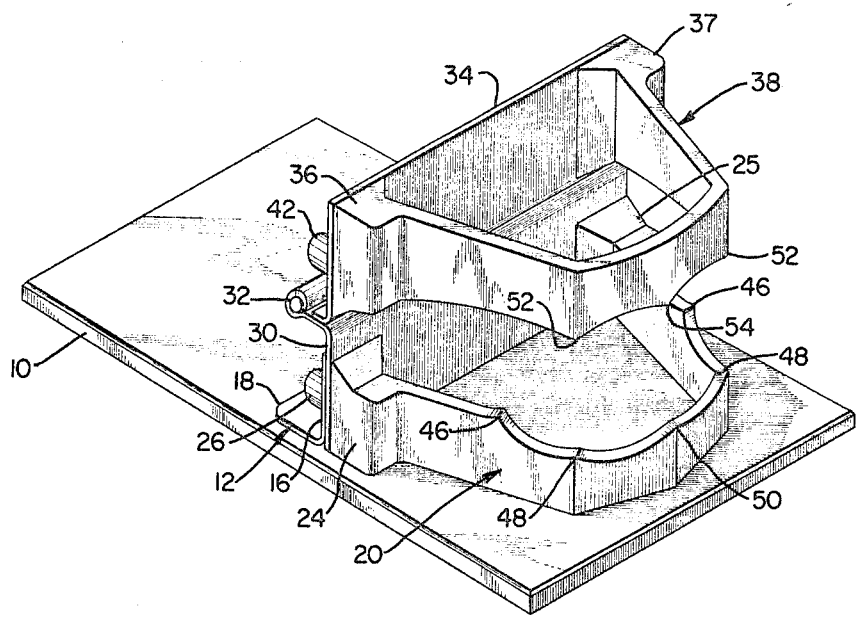
FIG. 2 is a perspective view of the model former of the invention with the movable mold in the closed position or folded over the stationary mold.

A hinge support bracket 30 is permanently mounted in a fixed position to leg 16 of mounting bracket 12 by means of thumb nuts 26 and threaded studs 22 which clamp it between arm 16 and bosses 24 and 25 of form 20. This hinge support bracket 30 is connected by a conventional hinge structure indicated generally at 32 to movable hinge support bracket 34. Movable hinge support bracket 34 is connected to bosses 36 and 37 of movable form 38 by means of internal studs 40 and internally threaded lugs 42 which are threadably attached to the threaded extensions 44 of lugs 40. This arrangement permits movable form 38 to lie flat on base 10 in the open position and to fold over stationary form 20 as shown in FIG. 2 in the open position.

It will be noted that mounting angle bracket 12 is flexible in a vertical plane and rigid in a horizontal plane. The flexibility of the bracket in the vertical plane insures that both forms fit flat on the top of the base so that wet mold material, such as plaster, will not leak out between the forms and the top of the base. It also provides stability to the device. The stationary form 20 is ordinarily referred to as the upper form as in the usual practice the model of the upper dental arch is made in this form, and the movable form 38 is referred to as the lower form as the lower dental arch model is molded in this form.

The stationary form 20 adapted to mold the upper arch is provided with opposed points 46 and 48 and central point 50 with curved depending arches between the points. The purpose of this structure is to provide an edge which serves as a template or guide for fingering to simulate the tissue portion of the arch in its natural form. The points 46 represent muscle and the points 48 represent the cuspids. The central point 50 serves as an aligning point for the model of the upper arch. The movable form 38 is likewise provided with cuspid points 52 and central aligning point 54. By using the top surfaces of the forms as a template or guide, the dentist can finger the model to simulate the contour of the soft tissue of the soft tissue portion of the dental arches.

The use of the device in making models of complementary upper and lower dental arches is as follows. The impressions of the dental arches are taken as previously explained and the rough models are poured and allowed to set. The rough models are trimmed if necessary and checked for size to insure that they fit in the former. It is preferable to soak the rough models in water if they have dried, for a few minutes before processing in the model former.

The model former is opened so that the movable or lower form 38 lies flat on the upper face of the base corresponding to the position of the stationary or upper form 20. Fresh plaster or other suitable mold material is poured into the lower form 38 and the rough model of the lower dental arch is placed in the plaster and oriented by means of the central aligning point 54 so that the occlusal plane is level with the hinge. The part of the plaster corresponding to the soft tissue portion of the arch is fingered or molded with the finger using the upper edge of the form as a guide.

After the lower model has set in the plaster, the upper rough model or model of the upper dental arch is positioned in occlusion with the lower model which is still in the form 20. The two dental arches are fastened together in occlusal relationship by means of a rubber band or other suitable means.

Plaster is now poured into the stationary or upper form 20 and the lower or movable form 38 carrying the two dental arches fixed together in occlusal relationship is moved to the closed position as shown in FIG. 2 so that the base portion of the upper arch is immersed in the plaster in form 20. The plaster corresponding to the soft tissue portion of the upper dental arch is fingered using the upper edge of the form as a guide. When the plaster has set enough to support the model, the rubber band is cut and pulled free and any small holes left by the rubber band are smoothed over with the finger.

After the plaster has set in both forms, the thumb nuts 26 and 42 are removed and the forms 20 and 38 separated from the hinge. Holding the new models of the arches and the forms, the threaded studs 44 and 28 are tapped gently against a hard surface to break any vacuum attachment caused by moisture from the plaster. The model is then easily separated from the mold.

It has been found that models can be produced with the above-described model former in which the normal occlusal alignment of the central arches is accurately reproduced. The model former is stable, does not leak plaster between the forms and the top of the base, can be moved for inspection of the assembly while the plaster is setting, and provides for inspection from all sides of the models as they are being formed. By provision of a base with the described associated structure, the problem of using a suitable surface for a base and other attendant disadvantages are removed. The device provides models which are in proper occlusal alignment without requiring any grinding operation.

It will be seen from the foregoing that preferred and alternate forms of model formers have been devised which may be adapted by various changes in the size, form, construction and composition and various forms of the present invention may be made and substituted for those shown and described herein without departing from the scope of the invention as defined by the appended claims.

What is claimed is:

1. Apparatus for forming models of upper and lower dental arches in required occlusal alignment, comprising: a substantially flat base member; an angle-shaped mounting bracket means mounted transversely of said base member; a stationary form for molding a model of one of said dental arches attached to said angle-shaped mounting bracket; and a movable form for molding a model of the other of said dental arches hingedly connected to said stationary form to provide for movement from an open position to a closed position directly opposed to said stationary form.

2. The apparatus of claim 1 in which the upper surfaces of said forms are contoured to correspond to the contour of the soft tissue of the respective dental arches.

3. The apparatus of claim 1 in which the arms of said angle-shaped mounting bracket form an obtuse angle at their juncture, whereby said stationary form is biased against said base.

4. Apparatus for forming models of upper and lower dental arches in required occlusal alignment, comprising: a substantially flat base member; an angle-shaped mounting bracket mounted transversely of said base member centrally thereof; a stationary hinge support bracket; a stationary form for molding a model of one of said dental arches, said hinge support bracket and said stationary form being removably attached to said angle-shaped mounting bracket; a movable hinge support bracket hingedly attached to said stationary hinge support bracket; and a movable form for molding a model of the other of said dental arches removably attached to said movable hinge support bracket.

5. The apparatus of claim 4 in which the arms of said angle-shaped mounting bracket form an obtuse angle at their juncture.

6. Apparatus for forming models of upper and lower dental arches in required occlusal alignment, comprising: a substantially flat base member; an angle-shaped mounting bracket mounted by one of its legs substantially transversely of said base member near its center with its other leg being flexible so that the mounting bracket is flexible in a vertical plane and rigid in a horizontal plane; a stationary mold for molding a model of one of said dental arches attached to said angle-shaped mounting bracket;

and a movable form for molding the other of said dental arches hingedly connected to said stationary form to provide for movement from an open position flat on said base to a closed position directly opposed to said stationary form.

References Cited by the Examiner

UNITED STATES PATENTS

| | | |
|---|---|---|
| 723,998 | 3/1903 | Feagan _____ 18—33 |
| 752,378 | 2/1904 | Dailey _____ 18—34.1 X |
| 1,224,687 | 5/1917 | Taliaferro. |
| 1,372,772 | 3/1921 | Nishi. |
| 2,691,190 | 10/1954 | Bethe et al. _____ 249—170 |
| 2,745,138 | 5/1956 | Beattie _____ 249—170 X |
| 2,929,104 | 3/1960 | Hutton _____ 18—34 X |
| 2,954,597 | 10/1960 | McFarland _____ 18—34 X |
| 3,060,494 | 10/1962 | Noble _____ 249—170 X |

J. SPENCER OVERHOLSER, *Primary Examiner.*

H. HOWARD FLINT, JR., *Examiner.*